(12) United States Patent
Sutherland et al.

(10) Patent No.: US 7,230,926 B2
(45) Date of Patent: Jun. 12, 2007

(54) ISOLATION TECHNIQUE FOR NETWORKS

(75) Inventors: David Sutherland, Gourock (GB); Robert Muir, East Kilbride (GB)

(73) Assignee: Intel Corporation, Santa Clara, CA (US)

( * ) Notice: Subject to any disclaimer, the term of this patent is extended or adjusted under 35 U.S.C. 154(b) by 1097 days.

(21) Appl. No.: 10/136,914

(22) Filed: May 1, 2002

(65) Prior Publication Data

US 2003/0177216 A1 Sep. 18, 2003

Related U.S. Application Data

(63) Continuation-in-part of application No. 10/097,027, filed on Mar. 12, 2002.

(51) Int. Cl.
| | |
|---|---|
| H04J 1/16 | (2006.01) |
| H04J 3/14 | (2006.01) |
| H04L 1/00 | (2006.01) |
| H04L 12/26 | (2006.01) |

(52) U.S. Cl. .................... 370/241; 370/242; 370/248; 370/249

(58) Field of Classification Search ................ 370/241
See application file for complete search history.

(56) References Cited

U.S. PATENT DOCUMENTS

| | | | |
|---|---|---|---|
| 6,047,330 A | 4/2000 | Stracke, Jr. | |
| 6,052,727 A | 4/2000 | Kamalanathan | |
| 6,085,243 A | 7/2000 | Fletcher et al. | |
| 6,098,103 A | 8/2000 | Dreyer et al. | |
| 6,114,968 A | 9/2000 | Ramakrishnan et al. | |
| 6,170,022 B1* | 1/2001 | Linville et al. ............... 710/29 |
| 6,405,262 B1* | 6/2002 | Vogel et al. ................ 719/315 |
| 6,556,541 B1 | 4/2003 | Bare | |
| 6,574,664 B1 | 6/2003 | Liu et al. | |
| 6,636,499 B1 | 10/2003 | Dowling | |
| 6,961,334 B1* | 11/2005 | Kaczmarczyk .............. 370/354 |
| 2002/0116529 A1* | 8/2002 | Hayden ..................... 709/245 |
| 2002/0120672 A1 | 8/2002 | Butt et al. | |
| 2002/0196801 A1* | 12/2002 | Haran et al. ................ 370/432 |
| 2003/0048801 A1 | 3/2003 | Sala et al. | |
| 2003/0097425 A1 | 5/2003 | Chen | |

* cited by examiner

Primary Examiner—Chirag G. Shah
(74) Attorney, Agent, or Firm—Kacvinsky LLC

(57) ABSTRACT

Various embodiments and techniques are described to isolate a malfunction or faulty node in a network and to perform an action to address the malfunction.

43 Claims, 11 Drawing Sheets

ISOLATION TECHNIQUE FOR NETWORKS

CROSS-REFERENCE TO RELATED APPLICATION

This application is a continuation-in-part of U.S. application Ser. No. 10/097,027 entitled "Discovery Technique For Networks" filed on Mar. 12, 2002, incorporated by reference herein.

BACKGROUND

To allow communication between the various nodes of a network, the are address of a node should be discoverable when a new node is added to the network. Unfortunately, in some networks, the discovery and identification of new nodes is a tedious manual process. For example, in some types of networks, each user must call the service provider and provide the MAC address for their user equipment and wait for the address to be registered before they can begin use.

Additional problems may exist. A point-to-multipoint network may be a network where a node or device is able to directly communicate with two or more other nodes or devices. A point-to-multipoint network typically includes a portion or segment of the network that is shared or accessible by multiple nodes. In some types of networks, such as point-to-multipoint networks, there exists the possibility that two or more nodes or users may transmit at the same time, creating a collision of data signals on at least a portion of the network. A problem arises in some networks because one or more nodes may be unable to detect such a collision.

In addition, there are many failure mechanisms that can cause a user or customer equipment to send faulty packets or transmit incorrectly. Faulty packets or packets sent by malfunctioning equipment on some networks, such as point-to-multipoint networks, can sometimes create a storm of data and/or collisions on the network.

Therefore a need exists to provide a technique to isolate and address malfunctions or faults in a network.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

The following represents brief descriptions of the drawings, wherein.

DETAILED DESCRIPTION

Figure 1:
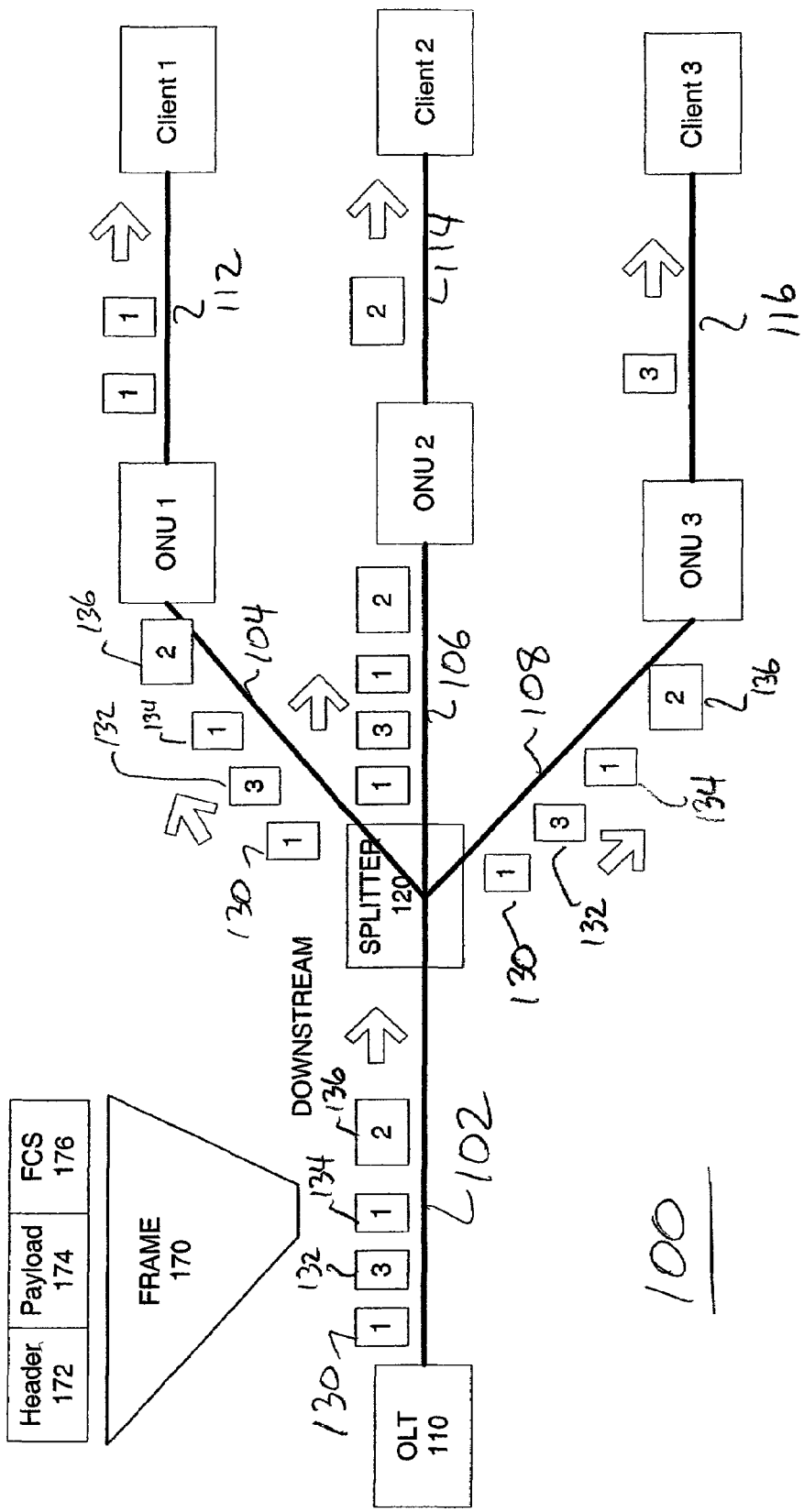
FIG. 1 is a block diagram of a network according to an example embodiment illustrating the flow of data in a downstream direction.

In the following detailed description, numerous specific details are set forth in order to provide a thorough understanding of the embodiments of the invention. It will be understood by those skilled in the art, however, that embodiments of the invention may be practiced without these specific details. In other instances, well-known methods, procedures, components and circuits have not been described in detail so as not to obscure the foregoing embodiments of the invention.

It is worthy to note that any reference in the specification to "one embodiment" or "an embodiment" means in this context that a particular feature, structure, or characteristic described in connection with the embodiment may be included in at least one embodiment of the invention. The appearances of the phrase "in one embodiment" or "an embodiment" in various places in the specification do not necessarily refer to the same embodiment, but may be referring to different embodiments.

A network typically comprises a number of nodes interconnected by a communications medium. The nodes may be capable of communicating information to other nodes over the communications medium using one or more protocols. As used herein, a node may include any device capable of communicating information, such as a computer, server, switch, router, bridge, gateway, optical network unit, customer premises equipment, headend, optical line terminal, and so forth. A node may include, for example, a processor, memory, input/output, and software for execution by the processor. Software may include a series of computer instructions or programs for execution by a processor or node which are stored in memory or other storage medium.

A communications medium may be any medium capable of carrying information signals, such as twisted-pair wire, coaxial cable, fiber optics, radio frequencies and so forth. A protocol may comprise a set of rules by which the information signals are communicated over a communications medium. For example, the protocol might be a packet switching protocol such as the Transmission Control Protocol (TCP) as defined by the Internet Engineering Task Force (IETF) standard 7, Request For Comment (RFC) 793, adopted in September, 1981 ("TCP Specification"), and the Internet Protocol (IP) as defined by the IETF standard 5, RFC 791 ("IP Specification"), adopted in September, 1981, both available from "www.ietf.org" (collectively referred to as the "TCP/IP Specification").

Currently, in certain types of networks, an address of a node is manually provided to the service provider before the node can begin communicating. An address may be, for example, an alpha-numerical value that uniquely identifies a node or its interface. To manually provide an address for a node, a user or technician typically is required to call the service provider to report the address of the user's node or equipment. This is a slow manual process.

Embodiments of the invention may be directed to automatically discovering one or more nodes of a network. According to one embodiment, a discovery loop may be implemented to detect new nodes that may have been added to the network. According to an embodiment, the data transmission from network nodes may be paused, and undiscovered nodes may be requested to identify themselves. Undiscovered nodes may then identify themselves, such as by providing their address. Each node that identifies itself may then be configured. Configuration may include, for example, assigning a time slot for data transmission from the node. Separate time slots may be assigned to allow multiple nodes to transmit data over certain types of networks without colliding with each other. Data transmission from the network nodes may then be resumed. This allows nodes on a network to be automatically discovered.

A data collision may occur in some networks when two nodes transmit at the same time. This may be a particular problem where two undiscovered nodes attempt to identify themselves at the same time, since the undiscovered nodes may not have been assigned a time slot yet. In certain types of networks, such as certain point-to-multipoint networks, some nodes may be unable to detect such a collision.

Therefore, according to one embodiment, one or more undiscovered nodes may identify themselves after waiting a random period of time. By waiting a random period of time, the probability of a data collision may be reduced. In yet another embodiment, a separate node may sense the network to determine whether a collision has occurred. If a collision is detected, the network nodes may be notified of the collision. The undiscovered nodes may then identify themselves again after waiting a random period of time.

According to yet another embodiment, an isolation technique or identification technique may be used to detect a fault condition and/or identify a faulty node on the network, and then perform an action to address the fault condition. A stay-alive frame may be sent (e.g., periodically sent) to one or more nodes or ONUs on the network to maintain the operability of the nodes for a predetermined time period. According to an example embodiment, at least a portion of a node, such as a transmitter or other circuit on the node may be disabled if a stay-alive frame is not successfully received at the node within a predetermined time period. After a faulty node is identified, stay-alive messages may be sent to nodes in the network excluding the faulty node. This will maintain the operability of the nodes in the network while allowing at least a portion of the faulty node to be disabled.

Alternatively, another action may be performed to address the fault condition. For example, a frame or message may be sent to the faulty node instructing the faulty node to disable at least a portion of itself. For example, the faulty node may disable its transmitter or other circuit in response to such a message.

According to an example embodiment, each node may include a timer (e.g., either software timer and/or hardware timer). Each time a stay-alive frame is successfully received at a node, the node's timer is typically reset or renewed. If the timer expires or reaches a predetermined value, the node may automatically disable at least a portion of the node. This may provide a safety mechanism or fail-safe mechanism to allow a transmitter or other portion of a node to be automatically disabled or shut-down if the node malfunctions.

Referring to the Figures in which like numerals indicate like elements, FIG. 1 is a block diagram of a network according to an example embodiment illustrating the flow of data in a downstream direction. A network 100 includes an optical line terminal (OLT) 110 that is connected to an optical splitter 120 via a fiber optic cable 102. OLT 110 transmits and receives data, and may perform some network administration and management functions. OLT 110 is sometimes referred to as a head-end, a central office equipment, or point-of-presence. Optical splitter 120 may also be referred to as an optical coupler or splitter since splitter 120 performs both an optical splitting and optical coupling function, depending on the direction of data flow. Although only one OLT and one splitter are shown, network 100 could include many OLTs and many optical splitters, depending on the network configuration.

Network 100 also includes several optical network units (ONUs), including ONU 1, ONU 2 and ONU 3 connected to splitter 120 via fiber optic cables 104, 106 and 108, respectively. The ONUs are also commonly referred to as subscriber terminals or customer premises equipment (CPE). A client is connected to each ONU. A client may be a computer, a software program running on a computer or other user of data or source of data. Client 1, client 2 and client 3 are connected to ONU 1, ONU 2 and ONU 3 via lines 112, 114 and 116, respectively. Although only three ONUs and three clients are shown in network 100, any number of ONUs and clients may be provided.

According to an example embodiment, OLT 110 may operate as an interface between a service provider's core network (not shown) and network 100, converting data between the optical format for use on network 100 and a format for use on the service provider's core network. OLT 110 may transmits data to ONUs and may receive data from ONUs in network 100. Although not shown, OLT 110 may include logic, such as media access control (MAC) logic to access the network 100 (including cable 102) and an optical transceiver (transmitter/receiver) logic for transmitting and receiving data on cable 102.

Likewise, according to one embodiment, each ONU may provide an interface between network 100 and the client or another network (such as a Local Area Network, etc.). Each ONU may communicate data between OLT 110 over network 100. ONUs may receive data in an optical format and convert the data to the customer's desired format (e.g., Ethernet, T1), and may convert data from the customer's format to the optical format for transmission over network 100, according to one embodiment. Thus, each ONU may convert signals between optical and electrical forms. Each ONU may include a media access control (MAC) logic and optical transceiver logic (not shown). Each ONU may have an address, such as a MAC address. According to an embodiment, packets or frames transmitted from OLT 110 may be selected by the ONU for processing by the associated client if the destination address of the frame matches the address of the ONU.

According to an example embodiment, network 100 may be a Passive Optical Network (PON), where one or more connections between components or nodes may be made using fiber optic cables, optical splitters and other passive components. Passive components may comprise components which do not pass nor require electrical power. PONs are being considered to address the segment of the communications infrastructure between the service provider's central office or head-end and business or residential customer's locations.

A PON is usually, for example, a high bandwidth point-to-multipoint (P2MP) optical fiber network based on one or more protocols, formats or standards. These standards may include, for example: Institute of Electrical and Electronics Engineers (IEEE) Std. 802.3, 2000 Edition, Carrier Sense Multiple Access with Collision Detection (CSMA/CD) Access Method and Physical Layer Specifications ("802.3 Ethernet specifications"), Time Division Multiplexing (TDM), ATM User-Network Interface Specification V. 3.1, 1994 ("ATM specifications"), etc. For example, a PON that sends and receives 802.3 Ethernet frames between nodes or devices may be referred to as an Ethernet PON (EPON). A point-to-multipoint network may include a network where a device (such as the OLT 110) may be able to directly communicate with two or more other nodes (such as the ONUs).

Network 100 is an example of a point-to-multipoint network. The tree structure of network 100 may allow OLT 110 to directly communicate with all (or many) of the ONUs (e.g., ONU 1, ONU 2 and ONU 3). Also, signals or frames sent from one ONU to OLT 110 may not be received by the other ONUs, but may be received only by the OLT 110.

Referring to FIG. 1, according to an example embodiment, network 100 may be an Ethernet Passive optical Network (EPON). OLT sends Ethernet frames, for example, to one or more ONUs, and receives Ethernet frames from the ONUs. According to an embodiment, the flow of frames from the OLT 110 to ONUs may be referred to as the downstream direction, and the flow of frames from ONUs to OLT 110 may be referred to as the upstream direction. Each Ethernet frame 170 may include a header 172 (including source and destination MAC addresses), a payload 174 and a frame check sequence (FCS) that may be used for error detection. OLT 110 may send variable length Ethernet frames that are specifically addressed to each of the ONUs, including frames 130 and 134 addressed to ONU 1, frame 132 addressed to ONU 3 and frame 136 addressed to ONU 2, as indicated by the numbers inside each frame shown in FIG. 1. An Ethernet frame is addressed to a specific ONU by using a destination MAC address in header 172 that matches the ONU's MAC address.

At the splitter 120, the traffic (e.g., Ethernet frames) is divided into three separate signals for cables 104, 106 and 108, each carrying all of the frames from the OLT 110. For example, as shown in FIG. 1, splitter 120 splits the received optical signals from OLT 110 to effectively generate (since it is the same signal) copies of frames 130, 132, 134 and 136 onto each of cables 104, 106 and 108. When the frames reach the ONUs, each ONU accepts frames intended for it (or addressed to it) and discards the frames not addressed to it. Each ONU then sends or passes the selected frames to the corresponding client for processing. There is typically no problem with data collisions in the downstream direction since there is only one data source (OLT 110), in this embodiment.

Figure 2:
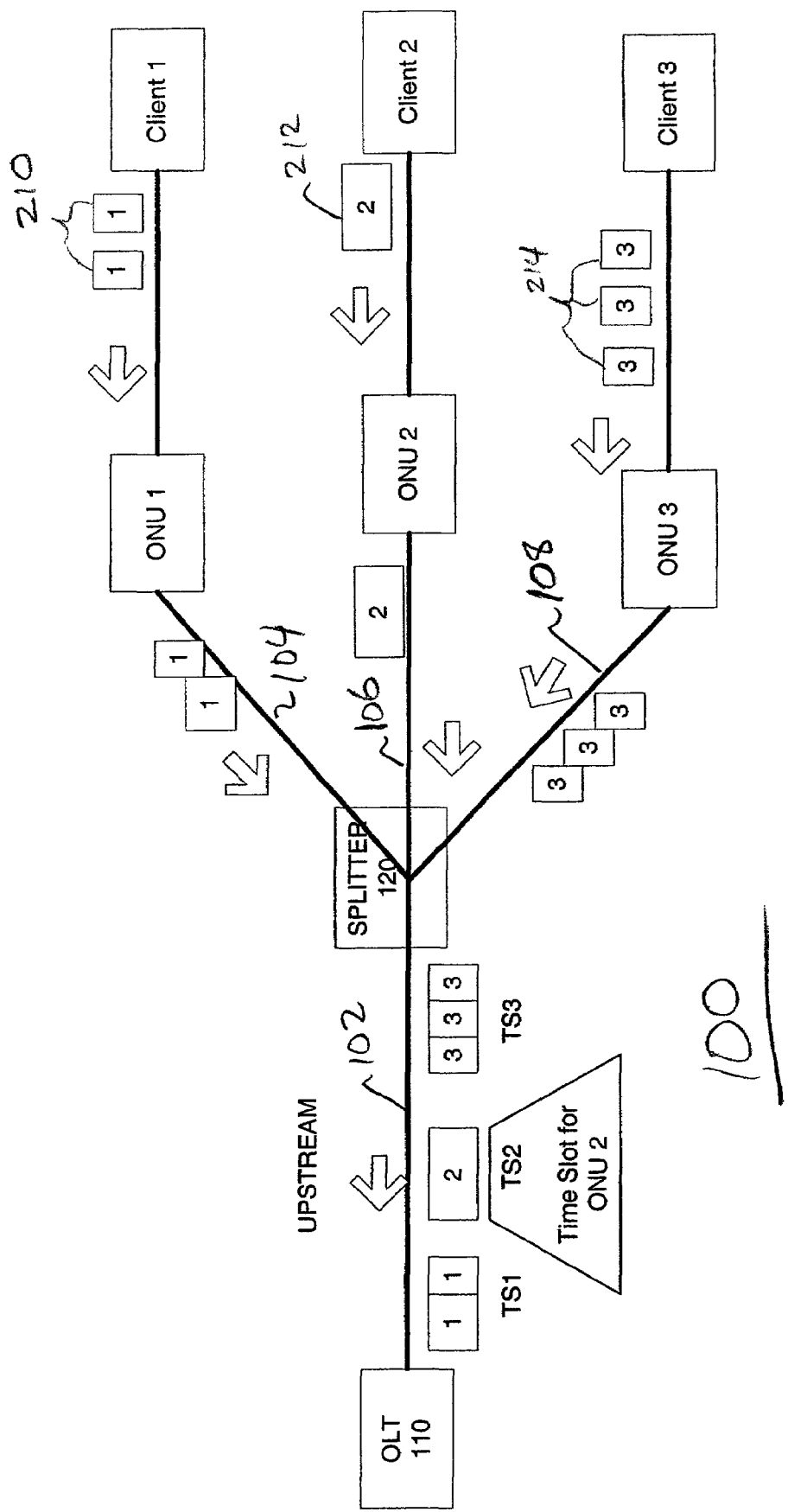
FIG. 2 is a block diagram of the network shown in FIG. 1 according to an example embodiment illustrating the flow of data in an upstream direction.

FIG. 2 is a block diagram of the network shown in FIG. 1 according to an example embodiment illustrating the flow of data in an upstream direction. According to an example embodiment, different fiber optic cables may be used to allow transmission in each direction (upstream and downstream) at the same time (i.e., full duplex). According to another embodiment, different channels over one cable (e.g., cable 102) may be used for upstream and downstream traffic. For example, different optical wavelengths or different Time Division Multiplexed time slots may be used for upstream and downstream traffic.

According to an example embodiment shown in FIG. 2, different wavelengths are used for upstream and downstream traffic. This allows upstream and downstream traffic to share the same fiber optic cable (e.g., cable 102). In addition, because many ONUs may transmit to OLT 110 in the upstream direction, Time Division Multiplexed time slots are assigned for each ONU to transmit to OLT 110 to prevent a collision, according to an example embodiment. The time slots are synchronized so that upstream frames from different ONUs do not interfere or collide with each other once the data is coupled onto common fiber optic cable 102 (or common fiber). For example, as shown in FIG. 2, client 1 generates two frames 210, which ONU 1 transmits upstream during time slot 1 (TS1), which is the time slot assigned to ONU 1; client 2 generates one frame 212 which ONU 2 transmits upstream during time slot 2 (TS 2), which is the time slot assigned to ONU 2; and client 3 generates three frames 214 which ONU 3 transmits during time slot 3 (TS 3). In this example, there are three non-overlapping time slots assigned to the three ONUs, respectively. A time slot is typically assigned to each ONU. Also, as shown in FIG. 2, the frames or signals transmitted from ONU 1, ONU 2 and ONU 3 upstream are coupled or combined by splitter 120 from three separate fibers or cables (104, 106, 108) onto a single fiber or cable 102.

Currently, in a cable modem network, the MAC address is typically manually provided to the service provider. To accomplish this, the user or technician typically calls the service provider to report the MAC address of the user's cable modem.

According to an example embodiment, an automatic discovery technique is provided where a line terminal (such as OLT 110) may automatically discover the MAC address of any undiscovered (or unregistered) nodes (such as ONUs).

Figure 3:
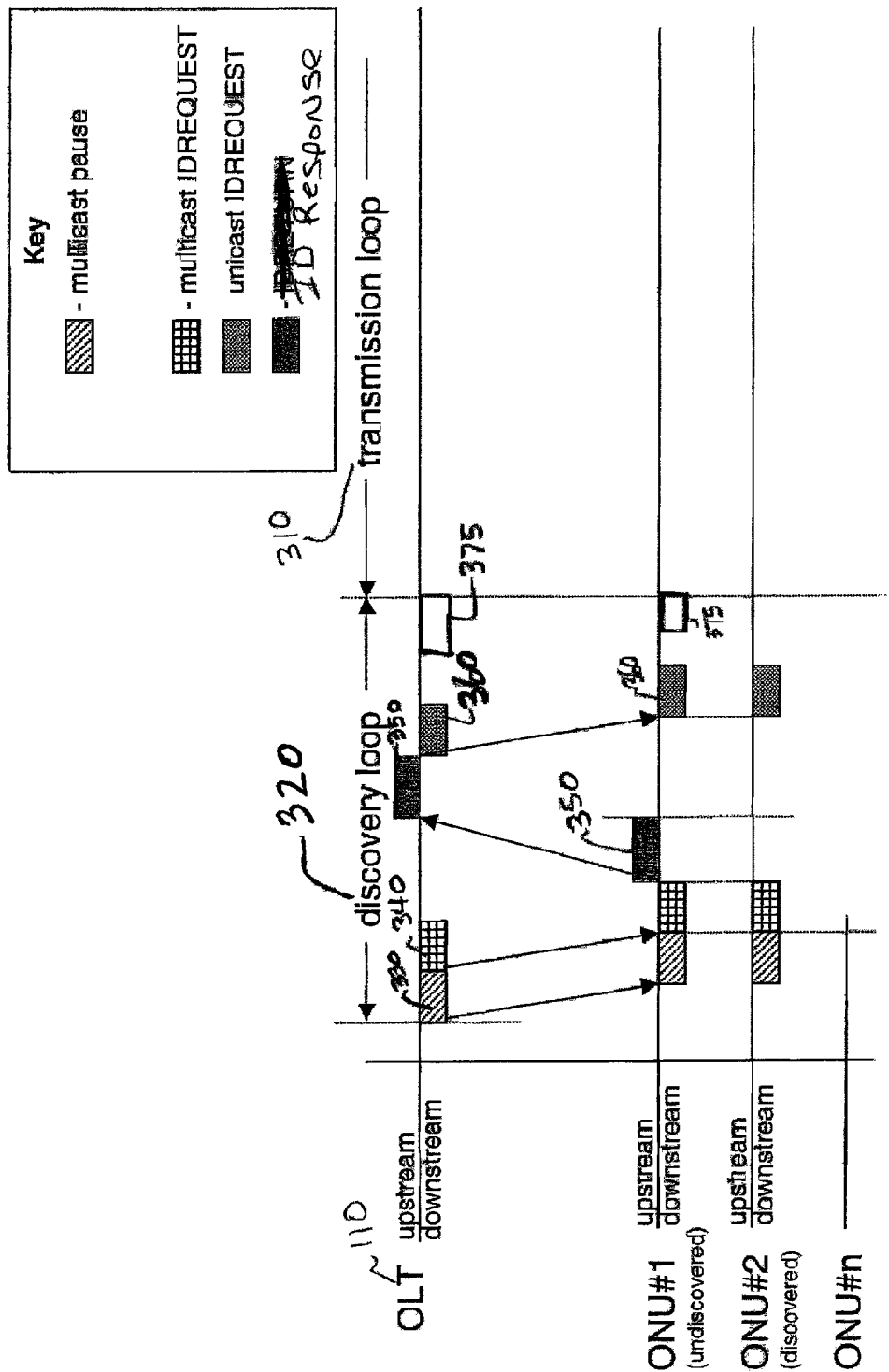
FIG. 3 is a timing diagram illustrating operation of a discovery technique according to an example embodiment.

FIG. 3 is a timing diagram illustrating operation of a discovery technique according to an example embodiment. Referring to FIG. 3, an OLT 110 is shown, along with ONU 1 and ONU 2. In this example, it is assumed that ONU 1 is undiscovered by OLT 110 (i.e., MAC address of ONU 1 is unknown to OLT 110), and OLT 110 already knows the MAC address of ONU 2. ONU 1 may be undiscovered because it may have just been added or connected to the network, for example. During normal operation, the network 100 (FIGS. 1 and 2) may operate in a data transmission loop 310 where ONUs are allowed to transmit data to OLT 110 and OLT 110 may transmit data to one or more ONUs. According to one embodiment, network 100 may periodically enter a discovery loop 320 in which OLT 110 may attempt to discover new ONUs.

The discovery loop 320 may be manually initiated (e.g., triggered by a network administrator) or automatically initiated by a computer or software program. For example, the network administrator may have been alerted by Email, telephone or other media that the network is being reconfigured or one or more ONUs have been added, etc. The network administrator may then initiate the discovery loop 320 to allow OLT 110 to discover the MAC addresses of any new ONUs, or to discover any existing ONUs where their MAC addresses may have changed or been reprogrammed. Alternatively, a computer program may automatically initiate the discovery loop, for example, when a network management computer or OLT 110 detects a predetermined event. For example, OLT 110 may be electronically notified of a change in the network or addition of a new ONU, causing the OLT 110 to initiate the discovery loop 320. The discovery loop may also be automatically initiated at regular times or intervals, or at specified times. As an example, the overhead associated with the discovery loop may be assigned a maximum percentage of network bandwidth or resources, and the discovery loop may be run automatically at intervals so as to use no more than the resources or bandwidth allocated for discovery.

Figure 6:
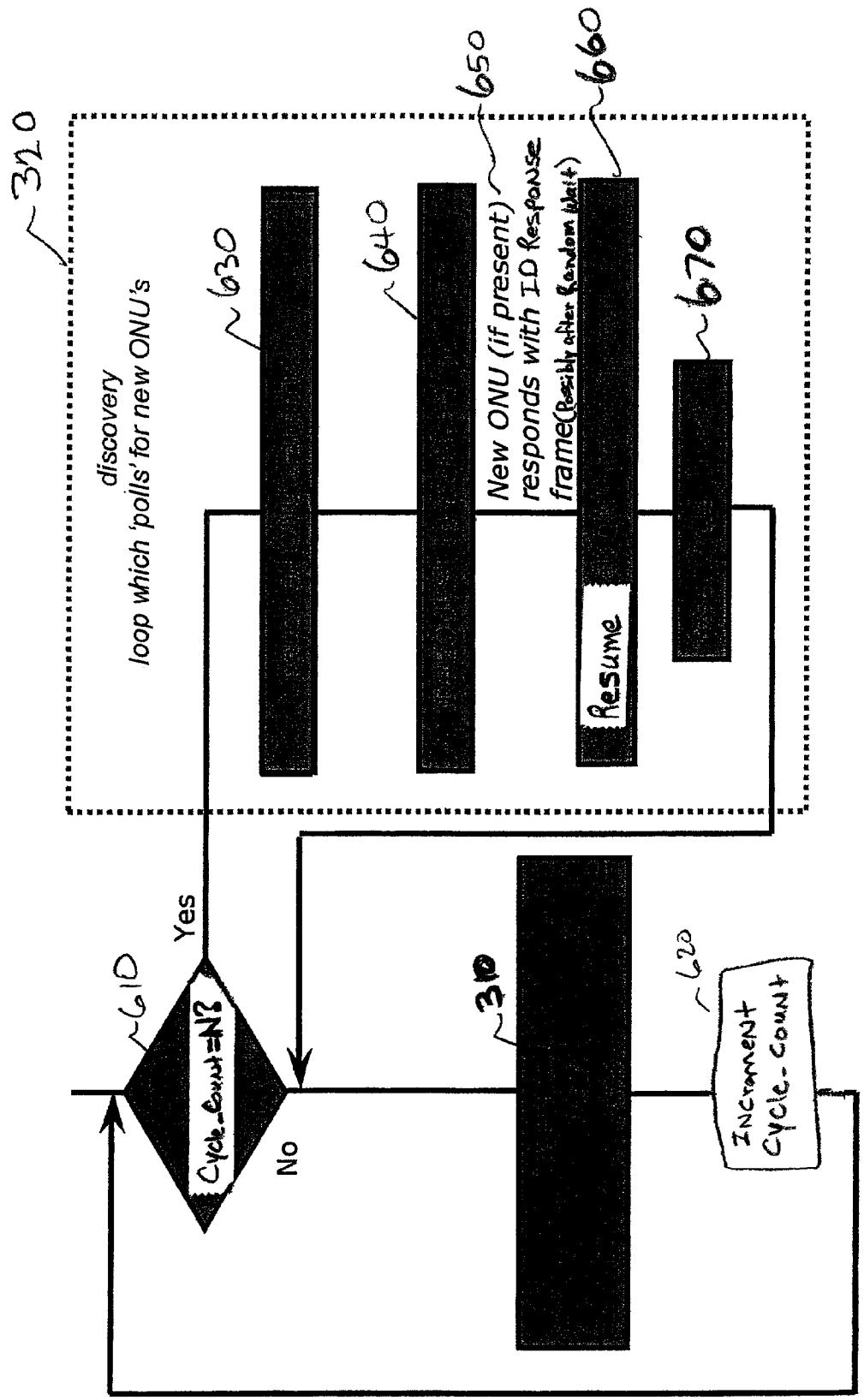
FIG. 6 is a flow chart illustrating operation of a discovery technique according to an example embodiment.

FIG. 6 is a flow chart illustrating operation of a discovery technique according to an example embodiment. Referring to FIGS. 3 and 6, according to an example embodiment, OLT 110 may maintain a counter (cycle_count) that counts the number of times the transmission loop 310 is performed. The transmission loop 310 (FIGS. 3, 6) may involve, for example, allowing ONUs to transmit data to OLT 110 for a specific period of time (e.g., 5 milliseconds). Cycle_count may be initialized to 0 for example. At 610 in FIG. 6, OLT 110 determines whether cycle_count is equal to a predetermined value (N). The predetermined value (N) may be set, for example, by a network administrator. If cycle_count does not equal N, then the transmission loop 310 may be entered. For example, in transmission loop 310, ONUs may be allowed to transmit data for a predetermined period of time. Cycle_count is incremented at 620, and a comparison is made again at 610. This process repeats until cycle_count eventually is equal to N. When cycle_count becomes equal to N, then control passes to discovery loop 320. This allows the discovery loop 320 to be run occasionally without burdening the network.

Referring to FIGS. 3 and 6, an operation of the discovery loop will be explained according to a first embodiment. At 630 in FIG. 6, OLT 110 pauses the transmission of non-control (e.g., data) traffic from the ONUs. This pause may be used to reduce or eliminate the upstream non-control traffic and thereby reduce the probability of a collision when one or more undiscovered ONUs send ID response messages (described below). ONUs may be paused, for example, by OLT 110 sending a multicast pause message 330 downstream that causes the ONUs to stop upstream data transmission for a specified time period. A multicast message is a message sent to multiple nodes.

Next, at 640 (FIG. 6), OLT 110 requests any undiscovered ONUs to identify themselves. This may be done, for example, by OLT 110 transmitting or sending a multicast identification request (ID request) message 340 (FIG. 3) to one or more of the ONUs.

At 650 in FIG. 6, if there are one or more ONUs that are undiscovered by OLT 110, the undiscovered ONUs identify themselves to OLT 110, in response to the ID request message 340. Each ONU may store, for example, a registry bit that indicates whether or not OLT 110 has discovered the ONU. This registry bit is initially cleared when a device or ONU is added or the network is reconfigured. Thus, according to an example embodiment, only those ONUs having a registry bit that is cleared (indicating that it has not yet been discovered) should identify themselves to OLT 110 in response to the ID request message 340.

Each undiscovered ONU may identify itself, for example, by sending a unicast identification response (ID response) message 350 upstream to OLT 110. A unicast message is sent to or addressed to one receiver or node (to OLT 110 in this case). According to an example embodiment, the identification response message 350 may identify the MAC address of the responding ONU. OLT 110 then stores or records the MAC address of the responding ONU. OLT 110 may also assign a time slot to the responding ONU for upstream transmission.

In response to receiving each ID response message 350, OLT 110 may send a unicast acknowledgement 360 to each responding ONU. Acknowledgement 360 may be provided, for example, as a unicast ID request message, containing the MAC address of the responding ONU in the destination MAC address field of the frame. The responding ONU receives the acknowledgement 360 and then sets its registry bit to indicate that OLT 110 has discovered it. Setting the registry bit will prevent the ONU from responding to future ID request messages. If an acknowledgement message 360 is not received within a predetermined time period, the undiscovered ONU may send a subsequent ID response message or messages to OLT 110.

The acknowledgement 360 may also notify the ONU of the time slot that has been assigned to it. The acknowledgement 360 (and/or subsequent messages) may also be used to exchange information between OLT 110 and the ONU regarding options, features or capabilities.

At 660 in FIG. 6, OLT 110 resumes data transmission from the ONUs. This may be performed, for example, by OLT 110 sending a resume message. An example of a resume message may be a multicast pause message 375 (FIG. 3) with the time period for pausing set to zero, which means no pause. Thus, message 375 may notify the ONUs that they may immediately resume transmitting data (non-control) messages upstream to OLT 110. Thus, pause message 330 operates to pause upstream data transmission from the ONUs, while message 375 un-pauses or resumes ONU data transmission (FIG. 3).

At 670 in FIG. 6, cycle_count is reset or cleared (e.g., cleared to zero), and control passes again to the transmission loop 310 (FIGS. 3 and 6).

If two ONUs (for example ONU 1 and ONU 2) transmit at the same time to OLT 110. Consequently, their signals may collide when these signals reach the common cable 102. According to an example embodiment, once OLT 110 has discovered an ONU, the ONU may transmit frames upstream during its assigned time slot, thereby preventing an upstream collision. Two or more undiscovered ONUs may receive the ID request message 340 and respond at the same time with respective ID response messages 350. This may create a collision on cable 102 because time slots have not yet been assigned to undiscovered ONUs, according to one embodiment. Unfortunately, due to the separate cables 104, 106 and 108 (FIGS. 1 and 2) for ONU 1, ONU 2 and ONU 3, the ONUs may be unable to detect the collision on cable 102 between the ID response messages 350 sent by two or more ONUs. This may be different from a traditional 802.3 Ethernet network where nodes may be able to sense or detect a collision using Carrier Sense Multiple Access/Collision Detection (CSMA/CD). In some point-to-multipoint networks (such as that shown in FIGS. 1 and 2), some nodes may be unable to detect signal collisions. As a result, a technique is needed for detecting and handling such collisions.

Therefore, according to an alternative embodiment, undiscovered ONUs may respond to receipt of the ID request message 340 (FIG. 3) by transmitting an ID response message 350 after a random wait period (not shown in FIG. 3). It is expected that because each undiscovered ONU waits a random period of time after receipt of the ID request message 340 before transmitting an ID response message 350, the probability for a collision will be reduced. Each undiscovered ONU may send out additional ID response messages 350 (e.g., after a random wait) if an acknowledgement from OLT 110 is not received within a predetermined time.

Figure 4:
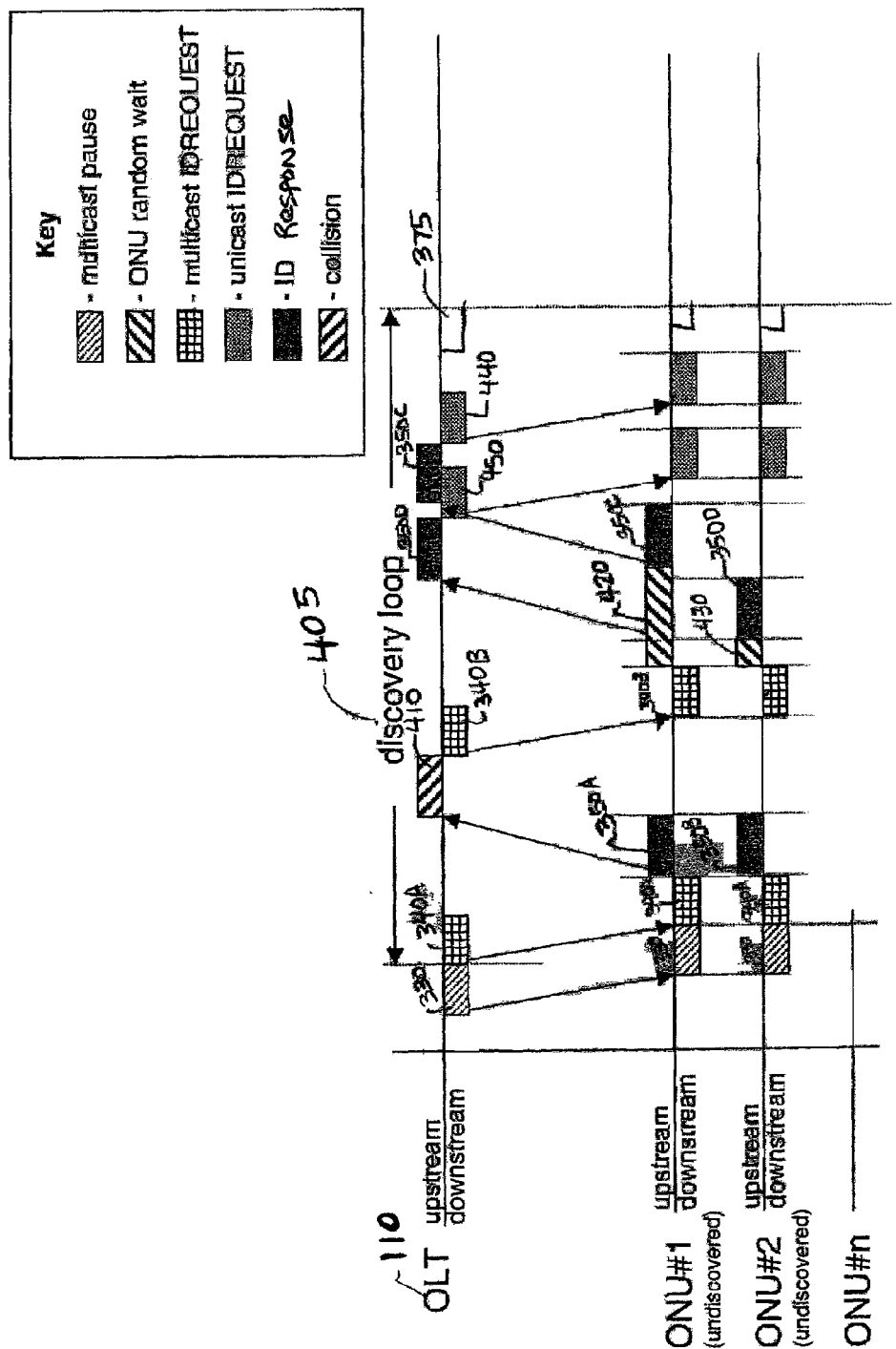
FIG. 4 is a timing diagram illustrating operation of a discovery technique according to another example embodiment.

FIG. 4 is a timing diagram illustrating operation of a discovery technique according to another example embodiment. In the embodiment shown in FIG. 4, an alternative technique is used to handle collisions. In this example, there are two undiscovered ONUs shown, ONU 1 and ONU 2. Referring to FIG. 4, at the beginning of the discovery loop 405, OLT 110 may send a multicast pause message 330 to pause the transmission of non-control frames from the ONUs.

Next, referring to FIG. 4, OLT 110 may send a first multicast ID request message 340A to the ONUs, requesting that any undiscovered ONUs provide their MAC address. In response to the ID response message 340A, undiscovered ONU 1 may transmit an ID response message 350A at the same time that undiscovered ONU 2 transmits an ID response message 350B. In this example, the response messages 350A and 350B therefore may collide with each other on cable 102 (FIGS. 1 and 2), as shown by collision block 410 (FIG. 4). OLT 110 may detect or sense the collision, for example, using CSMA/CD or other technique. ONU 1 and ONU 2, however, are typically unable to detect the collision due to the point-to-multipoint arrangement of network 100, according to one embodiment.

In response to the detected collision 410, OLT 110 transmits a second multicast ID request message 340B to the ONUs. In an example embodiment, the second multicast ID request message 340B may indicate that a collision has occurred or may contain a random back-off request. The random back-off request may request that ONUs respond after a random wait period.

In response to the second multicast ID request message 340B, ONU 1 and ONU 2 may back-off or wait a random time period before sending a second response. ONU 1 may wait a random time period 420 before sending ID response message 350C. ONU 2 may wait a random time period 430 before sending ID response 350D. In this example, because these random wait time periods 420 and 430 are quite different, the ID response messages 350C and 350D probably do not collide. The MAC addresses for each of ONUs 1 and 2 are stored or recorded by OLT 110. OLT 110 then sends unicast acknowledgements 440 and 450 to ONUs 1 and 2, respectively. OLT 110 may also configure the ONUs, such as assigning a time slot to each ONU.

ONU 1 and 2 may each determine that it should wait a random period of time, for example, based on a number of different criteria or conditions. ONU 1 and 2 may wait a random period of time due to the explicit instructions or information in the second ID request message 340B (e.g., indicating that a collision occurred or including a random back-off request), or based on the fact that a second ID request has arrived within a specific time period, or because no acknowledgement was received in response to its original ID response message (350A or 350B).

Finally, referring to FIG. 4, OLT 110 allows the transmission of upstream data traffic to resume, for example, by transmitting a multicast pause message 375 to all ONUs with the time period for pausing set to zero. Thus, by setting time period for pausing to zero, message 375 operates as a resume message. The zero informs the ONUs that they may resume transmission of upstream data.

IEEE 802.3 Ethernet specification describes in annex 31B a pause control frame that may be used for flow control. This pause message according to an example embodiment is used to pause or temporarily stop non-control (data) traffic in point-to-multipoint networks, for example. As shown in Table 1 below, according to an example embodiment, the multicast pause message (such as pause message 330) is implemented using the existing IEEE 802.3 Ethernet pause control frame (or alternatively to be very similar to the existing 802.3 pause control frame), preferably specifying a multicast destination address. The existing pause control frame in IEEE 802.3 also uses a multicast destination address.

In addition, IEEE 802.3 Ethernet specification currently reserves several unused opcodes for future use for MAC control frames. According to an example embodiment, two of these reserved opcodes are used for the ID request message and the ID response message. An advantage of this approach is that the discovery protocol and frame format for pause messages, ID request and ID response messages (e.g., as used and described above) will be compatible with the existing IEEE 802.3 Ethernet protocol. Thus, according to an example embodiment, the pause message may be implemented as an IEEE 802.3 pause MAC control frame, while the ID request message and the ID response message may be implemented as an extension to the existing IEEE 802.3 Ethernet protocol (e.g., using reserved opcodes).

TABLE 1

| Opcode (Hex) | MAC Control Function | Proposed Use in Point-To Multipoint Networks |
|---|---|---|
| 00-01 | PAUSE (specified in Annex 31B of IEEE 802.3, for flow control in Ethernet networks) | Requests that the recipient stop transmitting non-control (data) frames for a period of time indicated by the parameters of this function |
| 00-02 | ID Request | Requests that the recipient send its MAC address, if not already registered (discovered) |
| 00-03 | ID Response | Response frame containing source MAC address of CPE or ONU, e.g., in response to ID Request |

Figure 5:
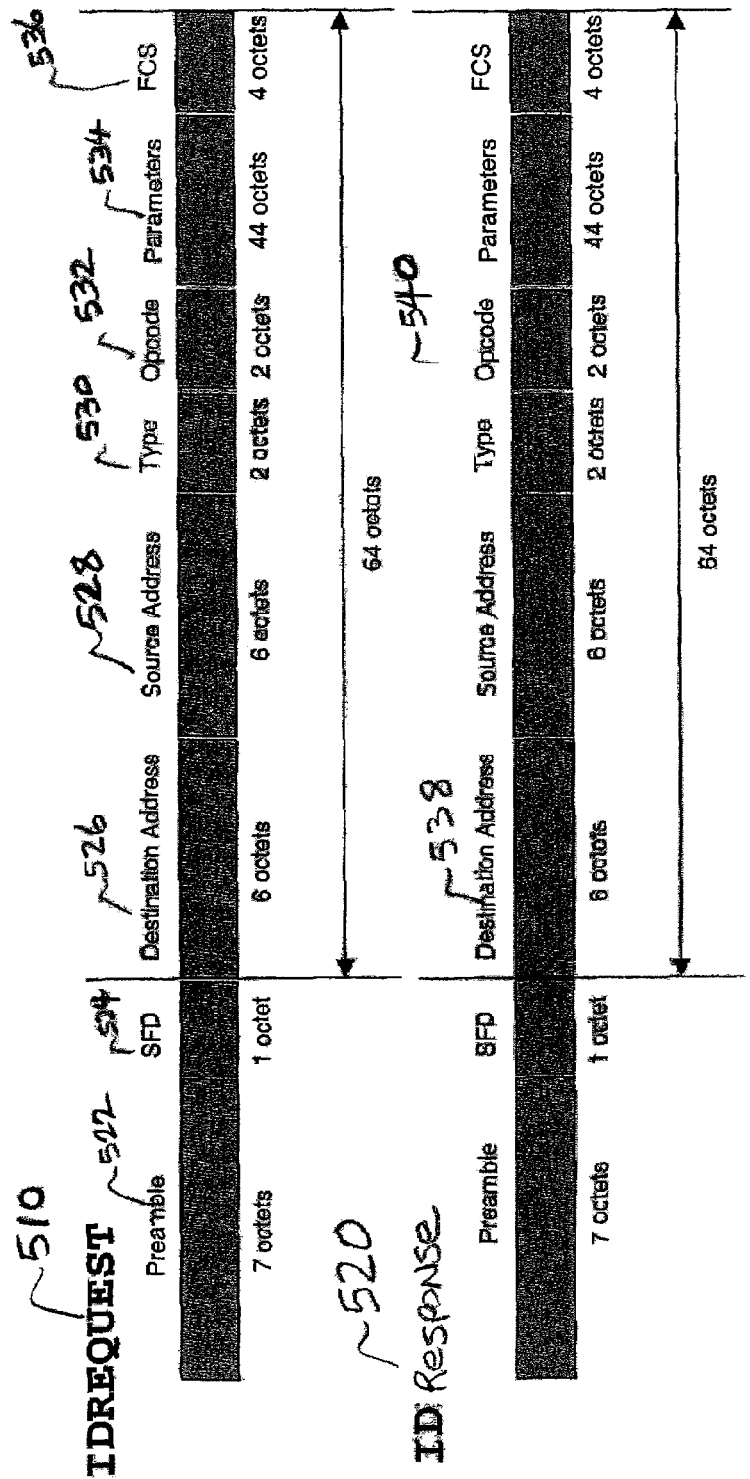
FIG. 5 is a diagram illustrating a format of ID request and ID response messages according to an example embodiment.

FIG. 5 is a diagram illustrating a format of ID request and ID response messages according to an example embodiment. The ID request message 510 is a multicast message and includes a preamble 522, a start frame delimiter (SFD) 524 indicating the start of the frame, a destination MAC address 526, a source MAC address 528, a type 530 indicating the type of frame (in this case, a MAC control frame), an opcode 532 specifying the type of function for the control frame, one or more parameters 534 and a frame check sequence (FCS) 536 for error detection. The Xs in the fields indicate that any valid numerical (e.g., hex) value can be used here. Destination address 526 is preferably a well-known multicast address because the ID request message is preferably sent as a multicast message. An opcode 532 of 0002 specifies that this frame is an ID request message.

ID response message 520 includes the same basic format at message 510. However, ID response message 520 is a unicast message, and thus, address 538 is a unicast address. Also, opcode 540 is 0003, specifying that this control frame is an ID response message.

Figure 7:
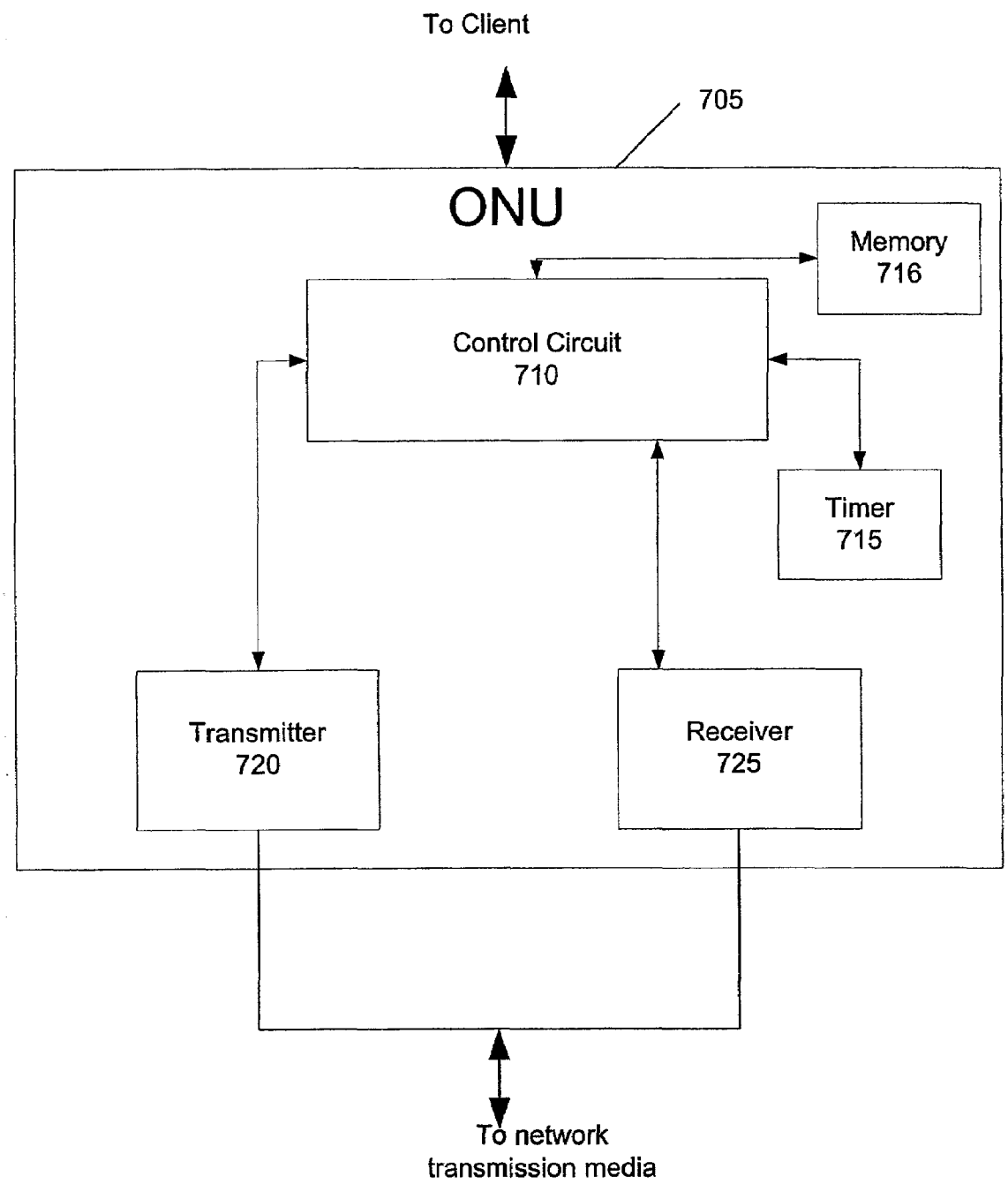
FIG. 7 is a block diagram of an example optical networking unit (ONU) according to an embodiment.

FIG. 7 is a block diagram of an example optical networking unit (ONU) according to an embodiment. ONU 705 may include a transmitter 720 for transmitting signals onto a transmission media, such as an optical cable. ONU 705 also includes a receiver 725 for receiving signals over a transmission media.

Transmitter 720 and receiver 725 are coupled to a control circuit 710 and a memory 716. Control circuit 710 may control operation of ONU 705. A timer 715, which may be used as a stay-alive timer described below, is coupled to control circuit 710. Control circuit 710 may control operation (e.g., resetting, starting, stopping) of timer 715 and other functions associated with ONU 705. Control circuit 710 may also disable a portion of or all of a node or of ONU 705. For example, control circuit 710 may disable operation of at least a portion of ONU 705 such as transmitter 720 or receiver 725 or other circuit or portion of ONU 705, may shut-down or power-down operation of ONU 705, may reset ONU 705. In another embodiment, all or part of control circuit 710 and timer 715 may be provided within a corresponding client or client computer that is coupled to ONU 705 (such as, for example, client 1 in FIG. 2). Control circuit 710 and timer 715 may be hardware, software or a combination of hardware and software, and may include a microprocessor. According to an embodiment, an ONU and a corresponding client or client computer (coupled to the ONU) may be considered to be a single node on a network.

Figure 8:
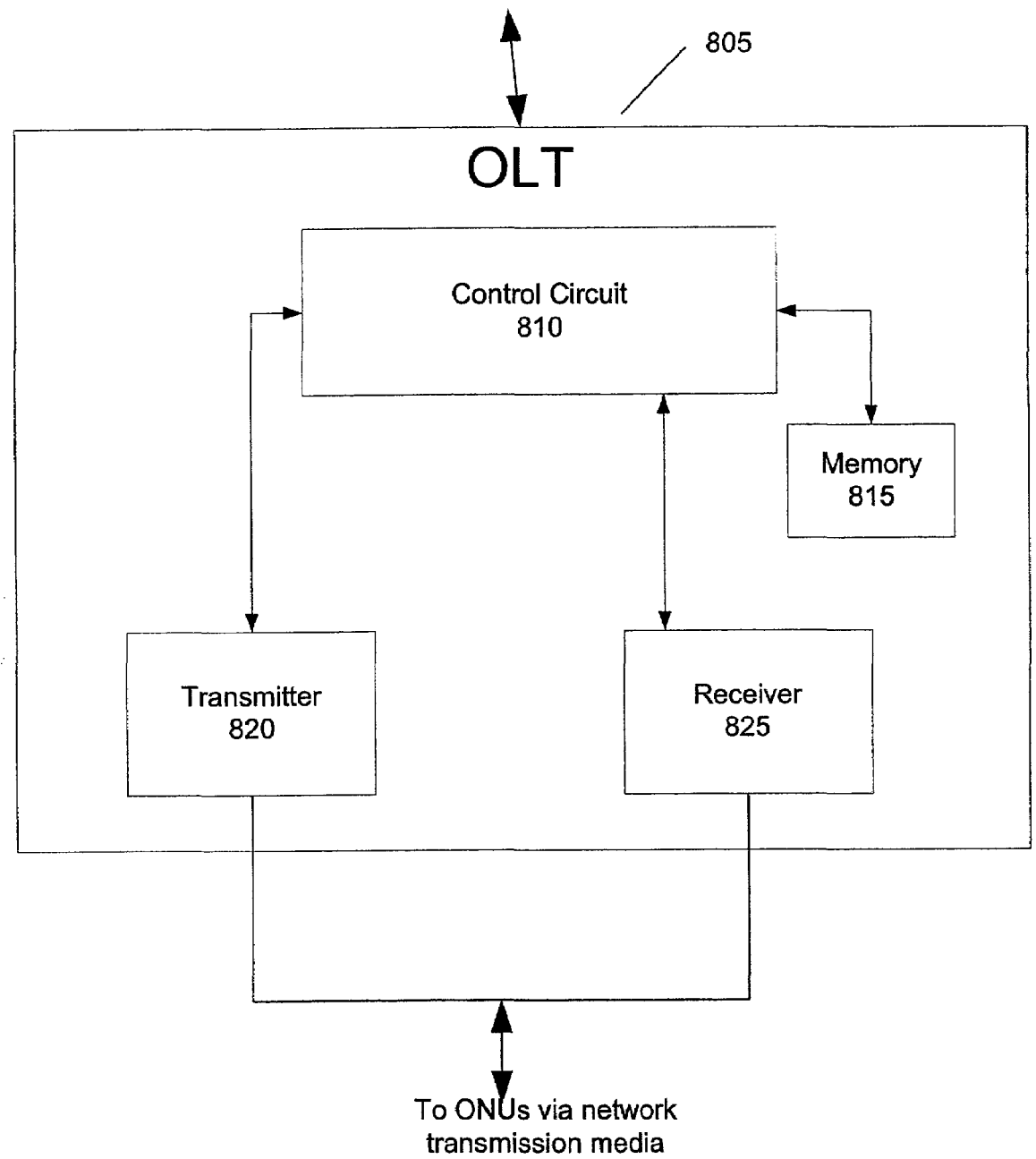
FIG. 8 is a block diagram of an example optical line terminal (OLT) according to an embodiment.

FIG. 8 is a block diagram of an example optical line terminal (OLT) according to an embodiment. OLT 805 may include a transmitter 820 for transmitting signals onto a transmission media, such as an optical cable. OLT 805 also includes a receiver 825 for receiving signals over a transmission media. A control circuit 810 is coupled to a memory 815 and to transmitter 820 and receiver 825. Control circuit 810 may control operation and the various functions of OLT 805. Control circuit 810 may be hardware, software, or a combination of both. For example, in one embodiment, control circuit 810 may include a microprocessor and associated software for controlling operation of OLT 805 and other circuits for controlling and/or interfacing with transmitter 820 and receiver 825.

Figure 9:
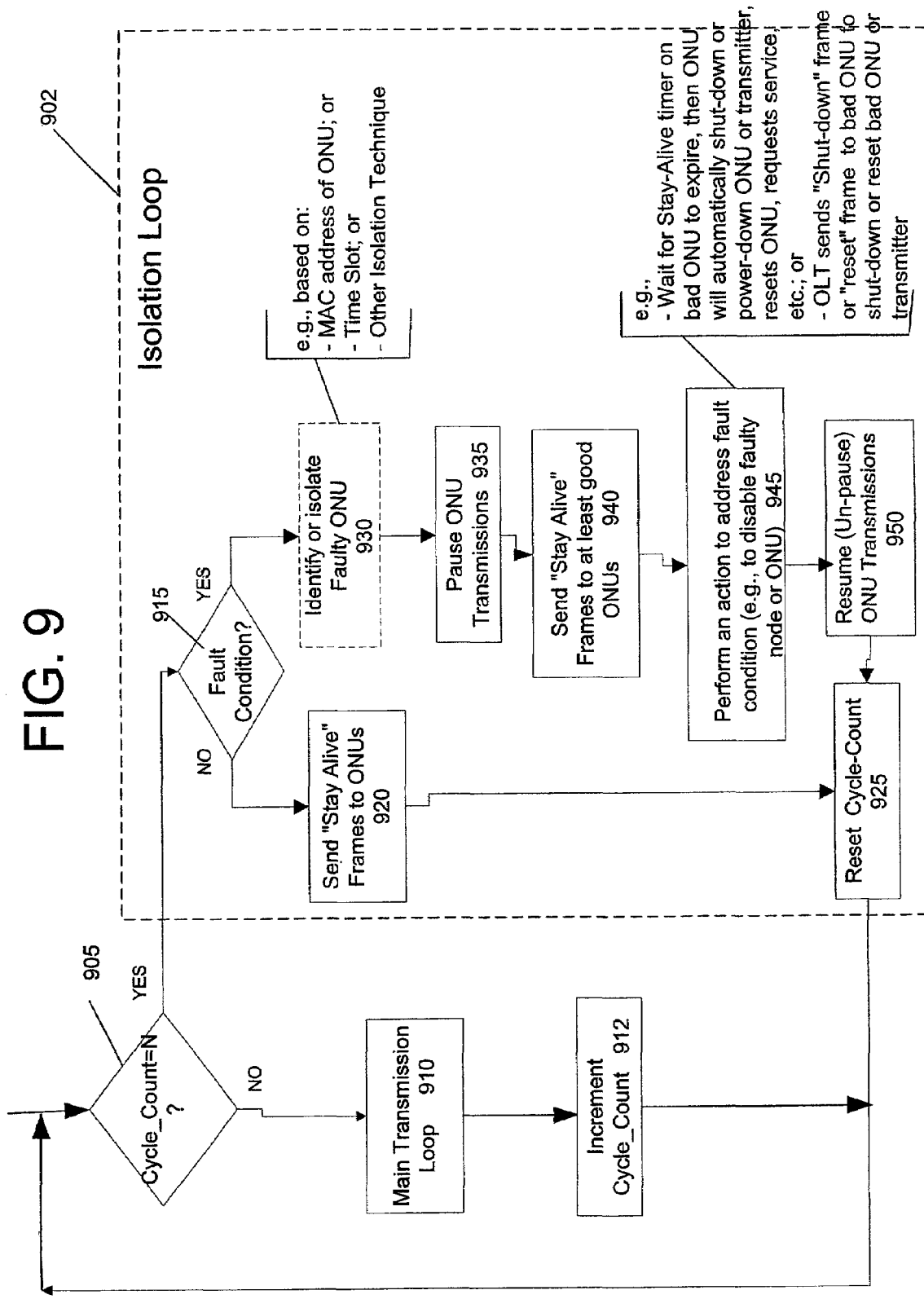
FIG. 9 is a flow chart illustrating operation of an isolation technique according to an example embodiment.

FIG. 9 is a flow chart illustrating operation of an isolation technique according to an example embodiment. According to an example embodiment, OLT 110 (FIG. 1) (or OLT 805) may maintain a counter (cycle_count) that counts the number of times the transmission loop 910 is performed. Cycle_count may be initialized to 0 for example. Referring to FIG. 9, at 905 in FIG. 8, OLT 110 (FIG. 1) determines whether cycle_count is equal to a predetermined value (N). The predetermined value (N) may be set, for example, by a network administrator. If cycle_count does not equal N, then the transmission loop 910 may be entered. The transmission loop 910 may involve, for example, allowing ONUs to transmit data to OLT 110 for a specific period of time (e.g., 5 milliseconds) on specific TDM time slots.

Cycle_count is incremented at 912 in FIG. 9, and a comparison is made again at 905. This process repeats until cycle_count eventually is equal to N. When cycle_count becomes equal to N, then control passes to isolation loop 902. This allows the isolation loop 902 to be run occasionally or periodically without burdening the network.

At 915 of FIG. 9, OLT 110 determines or detects whether there is a fault condition on the network. A number of different techniques may be used to determine whether a fault condition exists on the network. For example, OLT 110 may detect that an ONU is transmitting at the wrong time without permission, such as transmitting during an incorrect time slot, or at a time when the ONUs have been paused. Another example of a fault condition may be where an ONU transmitter is transmitting erroneous frames or "garbage" (e.g., bits that are transmitted in an improper frame format) due to an ONU or transmitter malfunction or where the transmitter may be stuck "On" and transmitting continuously. OLT 110 may also identify a fault condition on the network if there is a significantly higher rate of collisions on the network that what occurs during normal operation. Also, a fault condition may be indicated if there is an unusually high number of frame check sequence (FCS) errors or cyclic redundancy check (CRC) errors on received frames. CRC and FCS are techniques that can be used to detect errors in frames or messages. Each of these conditions may indicate a fault or malfunction with an ONU or an ONU's transmitter, or other problem with the network.

If no fault is detected, the flow in FIG. 9 proceeds to 920. At 920, OLT 110 sends one or more stay-alive frames to one or more ONUs. A stay-alive frame may be sent (e.g., periodically sent by OLT 110) to one or more nodes or ONUs on the network to maintain the operability of the ONUs or nodes for a predetermined time period. The stay-alive frames may be sent as one (or more) multicast frame or as one or more unicast frames. If there are no faults detected, it may be more efficient to send a single (or few) multicast stay-alive frame to multiple nodes rather than sending multiple unicast stay-alive frames.

If a node or ONU has malfunctioned, for example, a transmitter malfunctioning and stuck in the "on" position, or transmitting erroneous data, these erroneous transmissions may create a firestorm of data collisions on cable 102 (FIG. 1). As a result of such collisions when there is a faulty or malfunctioning node, it may be difficult for other nodes or ONUs to send data to OLT 110 (e.g., because the faulty node may be sending data in erroneous time slots). In some cases, for instance if the ONU's receiver is also malfunctioning, it may even be difficult to send a frame to the faulty node instructing the faulty node to disable itself.

Therefore, according to an embodiment, a stay-alive frame may be sent to one or more nodes or ONUs on the network to maintain the operability of the nodes for a predetermined time period. The predetermined time period may be, for example, known in advance by each node, may be negotiated between OLT 110 and each ONU after the ONU is discovered, or may be indicated by a field within the stay-alive message. According to an example embodiment, at least a portion of a node, such as a transmitter, or other circuit on the node may be disabled if a stay-alive frame is not successfully received at the node within a predetermined time period after a last stay-alive frame was received by the node.

An operation of the stay-alive frame will be briefly described according to one or more example embodiments. As described above with reference to FIG. 7, each node may include a timer 715 (either software timer and/or hardware timer). The timer 715 may be reset (e.g., set to a predetermined time period or initial value), and then counts (e.g., up or down) as time proceeds. Each time a stay-alive frame is successfully received at the node, the timer 715 is typically reset (or renewed). On the other hand, if the timer expires or reaches a predetermined value, at least a portion of the node (e.g., ONU, transmitter or other circuit of the node) may be disabled. If a node is faulty or malfunctions (for example, is unable to receive messages or frames because the receiver or other circuit is malfunctioning), the stay-alive messages may not be successfully received at the faulty node. As a result, the node's timer 715 may expire or reach a predetermined value. If the node's timer expires or reaches a predetermined value, at least a portion of the faulty node will be disabled (e.g., shut-down, powered-down, disabled).

Thus, in some situations, the stay-alive timer 715 and the stay-alive messages may operate as a safety mechanism or fail-safe mechanism to automatically shut-down malfunctioning or faulty nodes or ONUs.

If a fault condition is detected at 915 in FIG. 9, the flow proceeds to 930. At 930, OLT 110 may identify or isolate the ONU or node that caused the fault condition on the network (i.e., the faulty ONU or the "bad" ONU). In some situations, it may not be easy to discover the identity of (or isolate) the faulty ONU. In other cases, however, it may be possible for OLT 110 or other node to examine the circumstances of the fault condition and then identify the faulty ONU or node. A number of different techniques can be used to possibly identify the faulty node or ONU. If an ONU is transmitting at incorrect times (e.g., during a pause period or during incorrect time slot), the faulty ONU may be identified by the source MAC address in the MAC frame. If erroneous frames or garbage are being sent during a particular time slot, OLT 110 may determine that the faulty ONU most likely corresponds to that particular time slot.

At 930, other isolation techniques may also be used in attempt to identify the faulty or malfunctioning ONU. For example, OLT 110 could separately pause each ONU and then monitor the corresponding time slot to ensure no data is transmitted at that time. Or, all the ONUs could be paused, and then OLT 110 could individually ask each ONU to send a specific reply.

At 935 in FIG. 9, OLT 110 pauses the data transmissions from one or more nodes in the network.

At 940, one or more stay-alive messages are sent to one or more ONUs or nodes in the network. According to an embodiment, stay-alive messages may be sent to at least the "good" nodes (the nodes in the network excluding the faulty node). Alternatively, the stay-alive messages may be sent to all nodes (including the faulty node). The stay-alive messages may be sent as one multicast message sent to all nodes, or as a plurality of unicast messages, for example. According to an embodiment, if a faulty node was identified at 930, stay-alive messages (e.g., unicast stay-alive messages) may be sent to all nodes (e.g., discovered nodes) in the network except the faulty node, at 940. Thus, if a fault has been detected, it may be advantageous to send multiple unicast stay-alive messages so that a faulty node can be excluded.

By continuing to periodically send stay-alive messages to the nodes that are operating correctly, the operability of these good nodes may be maintained. On the other hand, by not sending any further stay-alive messages to the faulty node, the timer for the faulty node may be permitted to expire, which may cause the faulty node to disable at least a portion of the faulty node (e.g., the faulty node's transmitter or other circuit).

At 945, an action may be performed (by either OLT 110 and/or a node) to address the fault condition. A number of different actions may be taken to address the fault condition. For example, according to an embodiment, the action performed at 945 may be allowing the timer for the faulty node to expire by ceasing to send further stay-alive messages to the faulty node. When the timer 715 expires or reaches a predetermined value, this will typically cause the faulty node to disable at least a portion of the faulty node (e.g., the faulty node's transmitter or other circuit). In addition, or in the alternative, OLT 110 or another node may send a message to the faulty node requesting the faulty node to disable (e.g., shut-down, power-down, turn-off, or otherwise disable) at least a portion of the faulty node. In addition, in response to a message requesting the node to disable itself or in response to the timer 715 expiring, the node (e.g., the client associated with the ONU) may send a message, such as by email, pager or other communications technique, to a predetermined node or address to request service or indicate a fault condition at the node.

At 950 in FIG. 9, OLT 110 resumes or un-pauses data transmissions from the nodes to OLT 110.

At 925, cycle_count is reset and then the flow proceeds back to 905, where the main transmission loop 910 may be entered.

Figure 10:
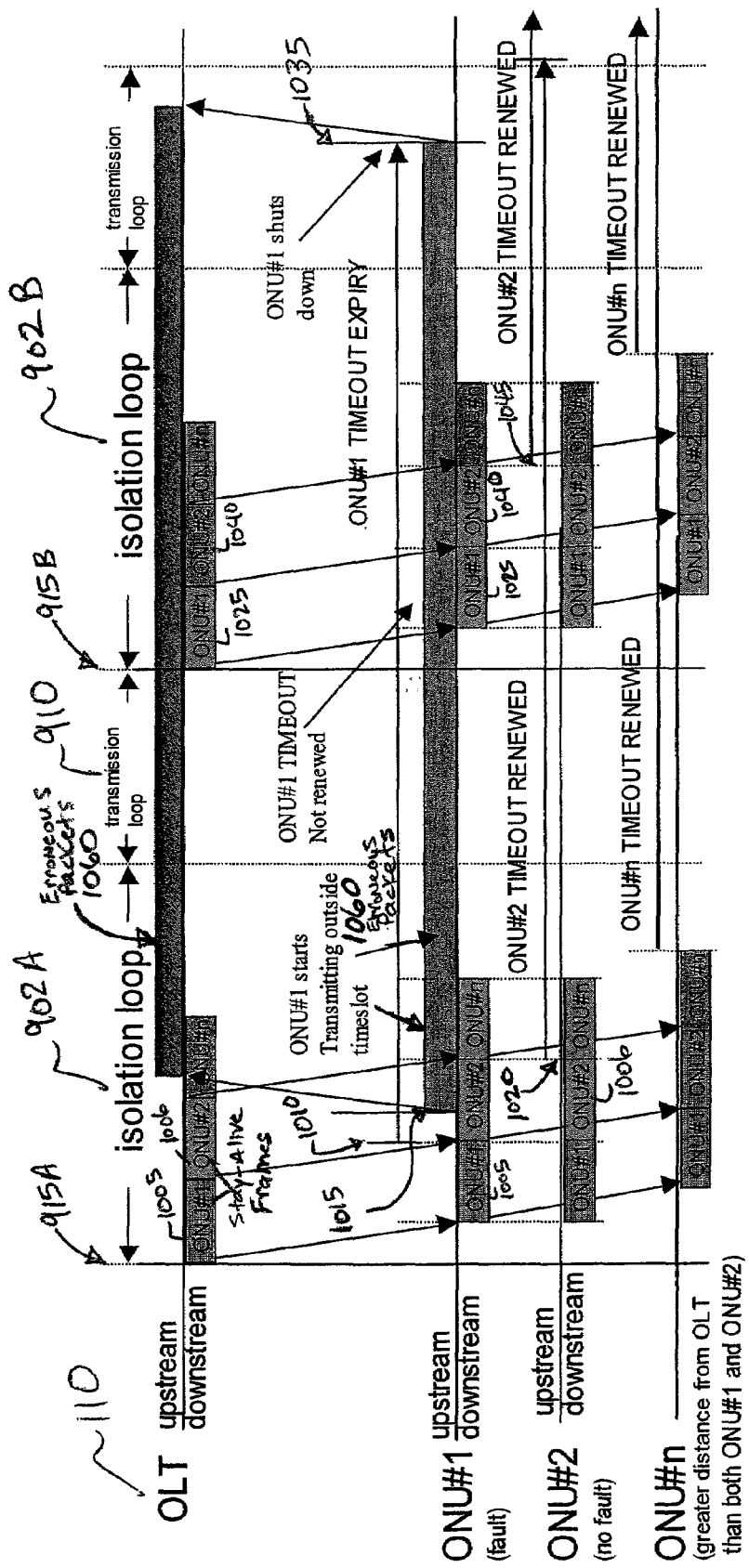
FIG. 10 is a timing diagram according to an example embodiment.

FIG. 10 is a timing diagram according to an example embodiment. OLT 110, and several ONUs are shown, including ONU 1 and ONU 2. As described above, OLT 110 transmits in the downstream direction, while ONUs transmit to OLT 110 in the upstream direction. The timing diagram of FIG. 10 shows a first isolation loop 902A, a transmission loop 910 and a second isolation loop 902B. In this example it is presumed that ONU 1 is a faulty node while ONU 2 and other nodes are operating properly.

Referring to FIG. 10, at the beginning of isolation loop 902A OLT 110 enters 915A (915, FIG. 9) to determine whether a fault condition exists. In this example, no fault condition is present at the beginning of isolation loop 902A. Because no fault condition exists at the beginning of isolation loop 902A, the OLT 110 proceeds to 920 (FIG. 9) and sends one or more stay-alive frames to nodes in the network, including stay-alive frame 1005 to ONU 1 and stay-alive frame 1006 to ONU 2, as examples. Although unicast frames are shown in this example in FIG. 10, a single multicast frame may be used instead.

Referring to FIG. 10, the stay-alive frame 1005 addressed to ONU 1 is received at ONU 1 at 1010. In this example, however, the stay-alive frame 1005 is not successfully received by ONU 1 due to a fault or malfunction with ONU 1. Thus, the timer 715 for ONU 1 is not reset or renewed during isolation loop 902A. Also, ONU 1 begins transmitting erroneous packets 1060 (e.g., packets sent outside its assigned time slot) at 1015 due to the fault or malfunction in ONU 1. Due to the fault or malfunction, ONU 1 continues transmitting erroneous packets 1060 continuously (in this example) during part of isolation loop 902A, through transmission loop 910 and into the next isolation loop 902B.

ONU 2 is operating properly in the example shown in FIG. 10. As a result, the stay-alive frame 1006 addressed to ONU 2 is successfully received and the timer 715 for ONU 2 is then reset or renewed at 1020. This maintains the operability of ONU 2. Next, the transmission loop 910 is entered and the nodes are permitted to transmit data to OLT 110.

Next, isolation loop 902B is entered by OLT 110. At 915B, OLT 110 determines whether a fault condition exists at 915. In this case, due to the erroneous packets sent from ONU 1, there is a high number of collisions or CRC errors (in this example), indicating a fault condition. At 930, OLT 110 examines the source MAC address of received frames and determines that the faulty ONU is ONU 1.

Next, within isolation loop 902B, OLT 110 sends stay-alive frames to at least the good ONUs in the network, 940 (FIG. 9). In the example shown in FIG. 10, a stay-alive frame is sent to each of the ONUs. In this example, however, ONU 1 is malfunctioning and does not successfully receive stay-alive frame 1025 that is addressed to ONU 1. As a result, the timer 715 for ONU 1 is not reset or renewed during isolation loop 902B. Because the timer for ONU 1 was not reset or renewed within the predetermined time period, the timer for ONU 1 expires or reaches and predetermined value, and at least a portion of ONU 1 is automatically disabled (e.g., shut-down, powered-down, turned off or otherwise disabled) at 1035. The timer for ONU 2 is reset or renewed again at 1045 when stay-alive frame 1040 is successfully received at ONU 2.

While a stay alive frame is sent to all ONUs (including faulty ONU 1) during isolation loop 902B in FIG. 10, it may be advantageous to not send any stay-alive messages to the faulty node (ONU 1 in this case) after the faulty node is identified. In some cases, the receiver of the faulty node may be operating properly, and in such cases, a received stay-alive message may operate to reset or renew the faulty node's timer, thus, allowing the faulty node to continue operation. Thus, it may be advantageous to send stay-alive message(s) to the nodes in the network excluding the faulty node to allow the timer for the faulty node to expire or reach the predetermined value. This approach may allow the faulty node to be disabled even when its receiver is operating properly.

Figure 11:
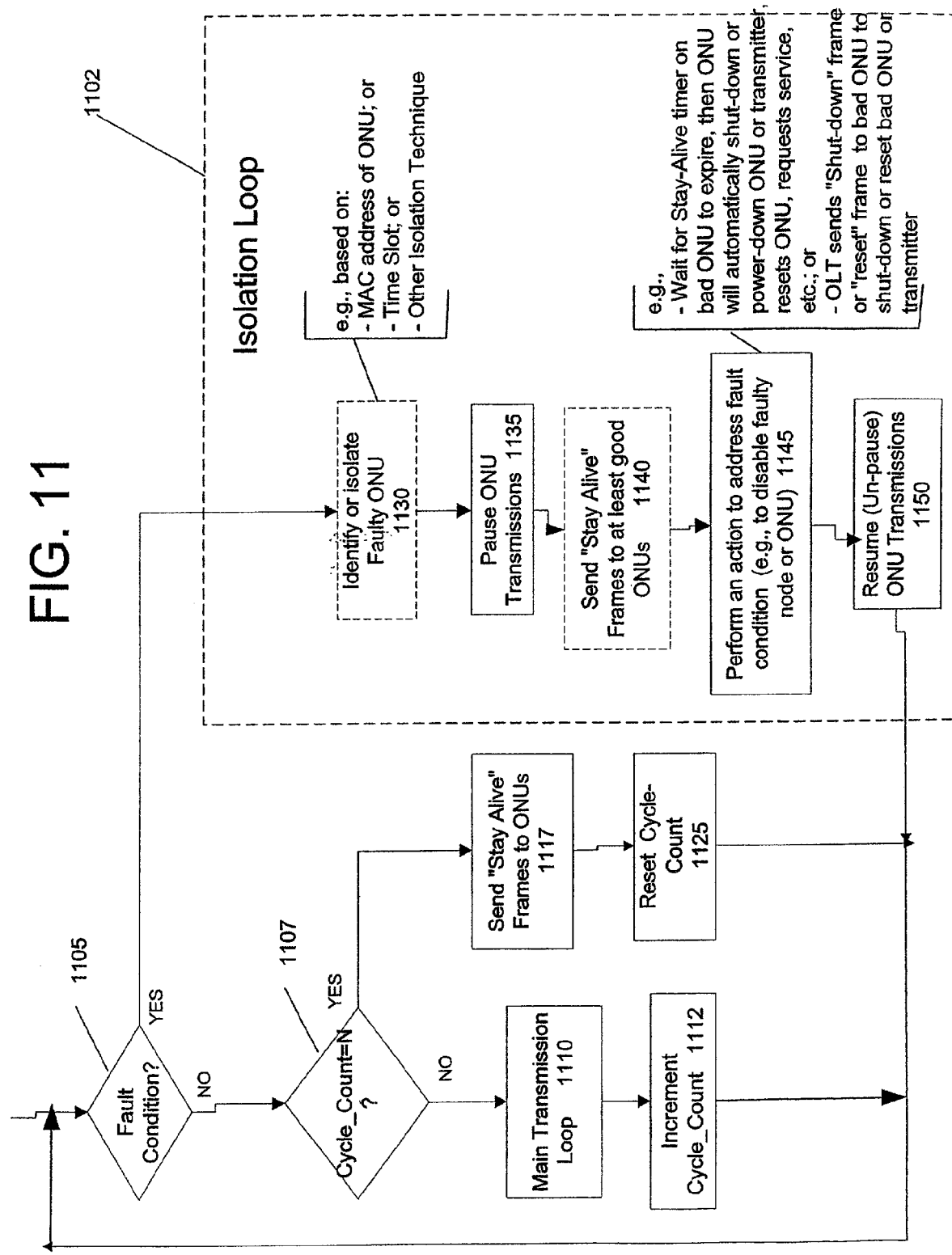
FIG. 11 is a flow chart illustrating operation of an isolation technique according to another example embodiment.

FIG. 11 is a flow chart illustrating operation of an isolation technique according to another example embodiment. This flow chart is slightly different from the flow chart illustrated in FIG. 9. In the flow chart of FIG. 9, the isolation loop is entered on a periodic basis (e.g., when cycle_count=N). In the flow chart of FIG. 11, however, the isolation loop 1102 is entered based upon the occurrence of a specific event (in this case, the detection of a fault condition). Thus, as shown in FIG. 11, an action is performed (1145) to address the fault condition in response to detection of a fault condition (1105), regardless of the value of cycle_count.

Referring to FIG. 11, OLT 110 detects whether a fault condition exists at 1105. If no fault condition exists, the flow proceeds to 1107 where cycle_count is compared to a predetermined value (N). If cycle count is not equal to N, then the main transmission loop 1110 is entered where nodes are permitted to transmit data. The cycle_count is then incremented at 1112.

If cycle_count is equal to N at 1107, then flow proceeds to 1117, where OLT 110 sends one or more stay-alive frames to one or more nodes in the network. Cycle_count is then reset to zero at 1125, and flow proceeds back to 1105.

If a fault condition is detected at 1105, the OLT 110 enters the isolation loop 1102. At 1130, the OLT 110 may identify or isolate the faulty ONU or faulty node. At 1135, ONU data transmissions are temporarily paused. At 1140, OLT 110 sends stay-alive messages to at least the good ONUs. At 1145, an action is performed to address the fault condition. Similar to that described in FIG. 9, this action may include allowing the faulty node to be disabled by expiration of its stay-alive timer or by sending the faulty node a message instructing the node to disable at least a portion of itself. Next, OLT 110 resumes or un-pauses the data transmissions from ONUs or nodes in the network. The flow then proceeds back to 1105.

In addition, in another embodiment, it may not be possible to detector isolate the faulty node in the network. In such case, all stay-alive messages may be temporarily paused or interrupted for all nodes until all nodes have been temporarily disabled. Each node may then be required to be re-discovered or re-register, and then stay-alive messages will be sent again to the discovered nodes. In this example, the faulty node may be unable to register or respond properly during the new discovery process. As a result, in this example, stay-alive messages may not be sent to the faulty node.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising: sending one or more stay alive messages to one or more nodes on a network; at least a portion of a node to be disabled if one of the stay-alive messages is not successfully received at the node within a predetermined time period after a last stay-alive message was successfully received; identifying a faulty node in the network; identifying a fault condition in a network; interrupting or pausing the transmission of stay-alive messages; waiting for at least a portion of one or more nodes in the network to be disabled when a stay-alive message is not successfully received at the node within a predetermined time period of a last stay-alive message that was successfully received; and sending one or more additional stay alive messages to one or more nodes in the network except the faulty node.

2. The method of claim 1 wherein the at least a portion of a node to be disabled comprises a node disabling at least its transmitter if one of the stay-alive message is not successfully received at the node within a predetermined time period after a last stay-alive message was successfully received.

3. The method of claim 1 wherein the at least a portion of a node to be disabled comprises a node disabling itself if one of the stay-alive message is not successfully received at the node within a predetermined time period after a last stay-alive message was successfully received.

4. The method of claim 1 wherein the sending comprises sending one or more unicast stay-alive messages to one or more nodes on a network.

5. The method of claim 1 wherein the sending comprises sending a multicast stay-alive message to one or more nodes on a network.

6. A method comprising: sending a stay-alive message to one or more nodes in a network to maintain the operability of the one or more nodes in the network for a predetermined time period; identifying a faulty node in the network; identifying a fault condition in a network; interrupting or pausing the transmission of stay-alive messages; waiting for at least a portion of one or more nodes in the network to be disabled when a stay-alive message is not successfully received at the node within a predetermined time period of a last stay-alive message that was successfully received; and sending one or more additional stay-alive messages to one or more nodes in the network except the faulty node.

7. The method of claim 6 wherein at least a portion of one of the nodes in the network to be automatically disabled if a stay-alive message is not successfully received at the node within a predetermined time period.

8. The method of claim 6 wherein at least a portion of the faulty node is automatically disabled by the faulty node when the one or more additional stay-alive messages are not received by the faulty node within a predetermined time period after a last stay-alive message was successfully received by the faulty node.

9. The method of claim 6 and further comprising sending a message to the faulty node instructing the faulty node to disable at least a portion of the faulty node.

10. The method of claim 9 wherein said sending a message to the faulty node comprises sending a message to the faulty node instructing the faulty node to disable at least the faulty node's transmitter.

11. The method of claim 6 and further comprising: pausing data transmissions from one or more nodes in the network; sending a message to the faulty node instructing the faulty node to disable at least a portion of the faulty node; resuming data transmissions from the one or more nodes in the network.

12. The method of claim 7 and further comprising: detecting a fault condition in the network; pausing data transmissions from one or more nodes in the network; performing an action to address the detected fault; and resuming data transmissions from the one or more nodes in the network.

13. The method of claim 12 wherein the performing comprises not sending any further stay-alive messages to the faulty node and waiting for at least a portion of the faulty node to be disabled before resuming data transmissions from one or more other nodes in the network.

14. The method of claim 6 wherein the sending comprises periodically sending a stay-alive message to one or more nodes in the network to maintain the operability of the one or more nodes in the network for a predetermined time period.

15. A method comprising: identifying a faulty node in a network; pausing data transmissions from one or more nodes in the network; waiting for at least a portion of one or more nodes in the network to be disabled when a stay-alive message is not successfully received at the node within a predetermined time period of a last stay-alive message that was successfully received; sending one or more stay-alive messages to one or more nodes in the network excluding the faulty node to maintain the operability of the one or more nodes in the network for a predetermined time period, at least a portion of the faulty node to be automatically disabled when a stay-alive message is not successfully received at the node within a predetermined time period after a last stay-alive message was successfully received; and resuming data transmissions from the one or more nodes in the network.

16. The method of claim 15 wherein said identifying comprises identifying a faulty node in a point-to-multipoint network.

17. The method of claim 15 wherein said identifying comprises identifying a faulty node in a passive optical network (PON).

18. A method comprising: identifying a fault condition in a network; waiting for stay-alive timers in one or more nodes in the network to expire or reach a predetermined value, at least a portion of one or more nodes in the network to be disabled when their stay-alive timers expire or reach a predetermined value; sending one or more stay-alive messages to one or more nodes in the network to resume or maintain operability of the nodes; identifying a faulty node in the network; interrupting or pausing the transmission of stay-alive messages; waiting for at least a portion of one or more nodes in the network to be disabled when a stay-alive message is not successfully received at the node within a predetermined time period of a last stay-alive message that was successfully received, said sending comprises sending one or more stay-alive messages to one or more nodes in the network excluding the faulty node to resume or maintain operability of the one or more nodes except the faulty node.

19. The method of claim 18 wherein said waiting comprises waiting for stay-alive timers in a plurality of nodes in the network to expire or reach a predetermined value, at least a portion of the plurality of nodes in the network to be disabled when their stay-alive timers expire or reach a predetermined value.

20. The method of claim 18 and further comprising: pausing data transmissions from one or more nodes in the network after the fault condition is identified; and resuming data transmissions from one or more nodes in the network after said sending one or more stay-alive messages.

21. A method comprising: sending one or more stay-alive messages to one or more nodes in a network to maintain the operability of the one or more nodes in the network for a predetermined time period; identifying a fault condition in a network; interrupting or pausing the transmission of stay-alive messages; waiting for at least a portion of one or more nodes in the network to be disabled when a stay-alive message is not successfully received at the node within a predetermined time period of a last stay-alive message that was successfully received; sending one or more stay-alive messages to one or more nodes in the network to resume or maintain operability of the nodes; identifying a faulty node in the network, said sending comprises sending one or more stay-alive messages to one or more nodes in the network excluding the faulty node to resume or maintain operability of the one or more nodes except the faulty node.

22. The method of claim 21 and further comprising: pausing data transmissions from one or more nodes in the network after a fault condition is identified; and resuming data transmissions from the one or more nodes after at least a portion of one or more nodes in the network has been disabled.

23. A method comprising: sending a stay-alive message to one or more nodes in a point-to-multipoint network to maintain the operability of the one or more nodes in the network for a predetermined time period, wherein at least a portion of at least one of the nodes in the network to be automatically disabled if a stay-alive message is not successfully received at the node within a predetermined time period since a last stay-alive message was successfully received; identifying a faulty node in the point-to-multipoint network; identifying a fault condition in a network; interrupting or pausing the transmission of stay-alive messages; waiting for at least a portion of one or more nodes in the network to be disabled when a stay-alive message is not successfully received at the node within a predetermined time period of a last stay-alive message that was successfully received; and sending one or more additional stay-alive messages to one or more nodes in the point-to-multipoint network except the faulty node.

24. The method of claim 23 wherein said step of sending comprises sending at least one of a multicast stay-alive frame and a unicast stay-alive frame to one or more nodes to maintain the operability of the one or more nodes in the network for a predetermined time period.

25. A method comprising: sending a stay-alive message to one or more nodes in a passive optical network (PON) to maintain the operability of the one or more nodes in the PON for a predetermined time period, wherein at least a portion of at least one of the nodes in the PON to be automatically disabled if a stay-alive message is not successfully received at the node within a predetermined time period; identifying a faulty node in the PON network; identifying a fault condition in a network; interrupting or pausing the transmission of stay-alive messages; waiting for at least a portion of one or more nodes in the network to be disabled when a stay-alive message is not successfully received at the node within a predetermined time period of a last stay-alive message that was successfully received; and sending one or more additional stay-alive messages to one or more nodes in the PON network except the faulty node.

26. The method of claim 25 wherein said step of sending comprises sending at least one of a multicast stay-alive frame and a unicast stay-alive frame to one or more nodes in the PON to maintain the operability of the one or more nodes in the PON for a predetermined time period.

27. The method of claim 25 wherein at least a transmitter or other circuit of at least one of the nodes in the PON to be automatically disabled if a stay-alive message is not successfully received at the node within a predetermined time period since the last stay-alive message was successfully received at the node.

28. A method comprising: detecting whether or not a fault condition exists in a network; if no fault condition exists, then allowing nodes in the network to transmit data and periodically sending stay-alive messages to the nodes; otherwise, if a fault condition is detected in the network, then:

pausing data transmissions from the nodes; performing an action to address the fault condition; and resuming data transmissions from the nodes; wherein said performing an action comprises identifying a faulty node; identifying a fault condition in a network; interrupting or pausing the transmission of stay-alive messages; waiting for at least a portion of one or more nodes in the network to be disabled when a stay-alive message is not successfully received at the node within a predetermined time period of a last stay-alive message that was successfully received; and sending one or more stay-alive messages to one or more nodes in the network excluding the faulty node to allow at least a portion of the faulty node to be disabled when a stay-alive message is not received within a predetermined time period.

29. The method of claim 28 wherein said performing an action comprises allowing at least a portion of at least one node to be disabled when a stay-alive message is not successfully received at the node within a predetermined time period.

30. The method of claim 28 wherein said performing an action comprises: identifying a faulty node; and sending a message to the faulty node instructing the fault node to disable at least a portion of the faulty node.

31. An article comprising: a computer-readable storage medium; said computer-readable storage medium including stored thereon instructions that, when executed by a computer, result in; sending one or more stay alive messages to one or more nodes on a network, wherein at least a portion of a node to be disabled if one of the stay-alive messages is not successfully received at the node within a predetermined time period; identifying a faulty node in the network; identifying a fault condition in a network; interrupting or pausing the transmission of stay-alive messages; waiting for at least a portion of one or more nodes in the network to be disabled when a stay-alive message is not successfully received at the node within a predetermined time period of a last stay-alive message that was successfully received; and sending one or more additional stay-alive messages to one or more nodes in the network except the faulty node.

32. An article comprising: a computer-readable storage medium; said computer-readable storage medium including stored thereon instructions that, when executed by a computer, result in; sending a stay-alive message to one or more nodes in a passive optical network to maintain the operability of the one or more nodes in the network for a predetermined time period; wherein at least a portion of at least one of the nodes in the passive optical network to be automatically disabled if a stay-alive message is not successfully received at the node within a predetermined time period; identifying a faulty node in the passive optical network; identifying a fault condition in a network; interrupting or pausing the transmission of stay-alive messages; waiting for at least a portion of one or more nodes in the network to be disabled when a stay-alive message is not successfully received at the node within a predetermined time period of a last stay-alive message that was successfully received; and sending one or more additional stay-alive messages to one or more nodes in the passive optical network except the faulty node.

33. The article of claim 32, wherein the stored instructions, when executed by a computer, further results in: detecting a fault condition in the network; pausing the transmission of data from at least one of the nodes; and performing an action to address the fault condition.

34. The article of claim 33, wherein the stored instructions, when executed by a computer, said performing results in allowing at least a portion of one or more nodes in the network to be disabled when a stay-alive message is not received within a predetermined time period.

35. An apparatus comprising: a circuit to send one or more stay alive messages to one or more nodes on a network, at least a portion of a node to be disabled if one of the stay-alive messages is not successfully received at the node within a predetermined time period after a last stay-alive message was successfully received; the circuit identifying a faulty node in the network; identifying a fault condition in a network; interrupting or pausing the transmission of stay-alive messages; waiting for at least a portion of one or more nodes in the network to be disabled when a stay-alive message is not successfully received at the node within a predetermined time period of a last stay-alive message that was successfully received; and sending one or more additional stay-alive messages to one or more nodes in the network except the faulty node.

36. The apparatus of claim 35 wherein the network comprises a point-to-multipoint network.

37. The apparatus of claim 35 wherein the network comprises a passive optical network.

38. The apparatus of claim 35 further comprising: one or more circuits to detect a fault condition in the network, to pause the transmission of data from at least one of the nodes, and to perform an action to address the fault condition.

39. The apparatus of claim 38 and further comprising a circuit to detect a faulty node.

40. The apparatus of claim 39 wherein said circuit to perform an action comprises: a circuit to send a stay-alive message to one or more nodes in the network excluding the faulty node, at least a portion of the faulty node to be disabled when a stay-alive message is not received within a predetermined time period after successfully receiving a last stay-alive message.

41. The apparatus of claim 39 wherein said circuit to perform an action comprises: a circuit to send a message to the faulty node instructing the faulty node to disable at least a portion of the faulty node.

42. An apparatus in a passive optical network comprising: a circuit to send one or more stay-alive messages to one or more nodes in a network to maintain the operability of the one or more nodes in the network for a predetermined time period; a circuit to identify a faulty node in the passive optical network, identify a fault condition in a network, interrupt or pause the transmission of stay-alive messages, and wait for at least a portion of one or more nodes in the network to be disabled when a stay-alive message is not successfully received at the node within a predetermined time period of a last stay-alive message that was successfully received; and a circuit to send one or more additional stay-alive messages to one or more nodes in the network excluding the faulty node if a fault is identified.

43. A system, the system comprising a line terminal or headend according to the apparatus of claim 42, the system further comprising: one or more nodes coupled to the terminal, each node comprising: a timer; a circuit to reset a timer when a stay-alive message is successfully received; and a circuit to disable at least a portion of the node if the timer expires or reaches a predetermined value.

* * * * *

UNITED STATES PATENT AND TRADEMARK OFFICE
CERTIFICATE OF CORRECTION

PATENT NO.       : 7,230,926 B2                                    Page 1 of 1
APPLICATION NO. : 10/136914
DATED            : June 12, 2007
INVENTOR(S)      : Sutherland et al.

It is certified that error appears in the above-identified patent and that said Letters Patent is hereby corrected as shown below:

In column 16, line 5, in Claim 1, delete "stay alive" and insert -- stay-alive --, therefor.

In column 19, line 22, in Claim 30, delete "fault" and insert -- faulty --, therefor.

In column 19, line 27, in Claim 31, after "in" delete ";" and insert -- : --, therefor.

In column 19, line 27, in Claim 31, delete "stay alive" and insert -- stay-alive --, therefor.

In column 19, line 43, in Claim 32, after "in" delete ";" and insert -- : --, therefor.

In column 20, line 7, in Claim 35, delete "stay alive" and insert -- stay-alive --, therefor.

In column 20, line 56, in claim 43, after "system," delete "the system".

Signed and Sealed this

Second Day of October, 2007

JON W. DUDAS
*Director of the United States Patent and Trademark Office*